United States Patent [19]

Coale

[11] 3,954,932
[45] May 4, 1976

[54] POLY(PHENYLENE SULFIDE) CONTAINING MIXTURES AND PROCESSES FOR PRODUCING FREE SINTERED PARTS THEREFROM

[75] Inventor: Harold D. Coale, Bartlesville, Okla.

[73] Assignee: Phillips Petroleum Company, Bartlesville, Okla.

[22] Filed: Sept. 26, 1974

[21] Appl. No.: 509,646

[52] U.S. Cl. .............................. 264/122; 260/79; 260/79.1; 264/126; 264/127; 264/236; 264/347
[51] Int. Cl.² .................. C08G 23/00; B29C 25/00
[58] Field of Search .......... 264/127, 236, 347, 122, 264/126; 260/37 R, 79, 79.1

[56] References Cited
UNITED STATES PATENTS

| | | | |
|---|---|---|---|
| 2,913,770 | 11/1959 | Beno | 264/347 |
| 3,562,199 | 2/1971 | Hill, Jr. et al. | 264/235 |
| 3,592,783 | 7/1971 | Edmonds | 260/2.5 |
| 3,716,609 | 2/1973 | Trocciola et al. | 264/235 |
| 3,717,620 | 2/1973 | Rohlfing | 260/79 |
| 3,793,256 | 2/1974 | Scoggin | 260/79 |
| 3,839,301 | 10/1974 | Scoggins | 260/79 |
| B312,139 | 1/1975 | Rees | 264/310 |

Primary Examiner—Jeffery R. Thurlow

[57] ABSTRACT

A process for free sintering parts made from mixtures of poly(phenylene sulfide) and at least one selected filler by subjecting molded parts to gradually increasing temperatures and then curing at an elevated temperature. Precured poly(phenylene sulfide) is first mixed with the selected filler and then compression molded to form a part of a desired shape. The part is then free sintered by being subjected to a gradually increasing temperature in an oven and cured. After curing, the part is cooled and is ready for use.

10 Claims, No Drawings

POLY(PHENYLENE SULFIDE) CONTAINING MIXTURES AND PROCESSES FOR PRODUCING FREE SINTERED PARTS THEREFROM

Poly(phenylene sulfide) is a relatively new engineering plastic compound and has a wide variety of uses. It has good mechanical and chemical properties and can be used for such things as structural parts and self-lubricating bearing parts. One of the problems encountered with poly(phenylene sulfide) to date has been that same requires high temperatures for extended periods of time for curing. Such being the case, molding of poly(phenylene sulfide) requires special equipment to maintain molds at the high temperature and because of the long curing time, the time required in the mold for curing is excessive and makes piece parts expensive. Accordingly, a large investment is required in capital equipment to mold poly(phenylene sulfide) in mass production quantities. Because of its physical and chemical characteristics and properties, it is highly desirable to have a process for molding poly(phenylene sulfide) which requires a minimum of molding time and hence molding equipment.

It is therefore the principal object of the present invention to provide a process and poly(phenylene sulfide) mixture for manufacturing parts by a free sintering process. Other objects of the present invention are: to provide a poly(phenylene sulfide) mixture which has improved processing characteristics so that same may be free sintered; to provide such a mixture for free sintering whereby the end result product can be used for a wide range of uses; to provide such a process and mixture which is adapted for mass production requiring a minimum amount of equipment; and to provide such a process and a mixture which is economical to use and well adapted for its intended use.

Other objects and advantages of the present invention will become apparent from the following detailed description wherein are set forth by way of illustration and example certain embodiments of the present invention.

As required, detailed embodiments of the present invention are disclosed herein, however, it is to be understood that the disclosed embodiments are merely exemplary of the invention which may be embodied in various forms. Therefore, specific details disclosed herein are not to be interpreted as limiting, but merely as a basis for the claims and as a representative basis for teaching one skilled in the art to variously employ the present invention in virtually any appropriate detailed manner.

Ordinarily in a sintering process, the material to be molded is compressed and heat cured while in the mold and under pressure which means that in mass production one mold cavity is required per piece part and for materials requiring long curing times, the molding equipment is tied up for long periods of time during the curing resulting in high cost. The present invention overcomes this difficulty and provides for a process of molding poly(phenylene sulfide) in combination with a filler material wherein parts are first suitably formed and then cured in a separate area having a heat source with the parts being free standing during curing, i.e., unconfined by the mold and under no external pressure which is known as free-sintering. In broad terms, the mixture, poly(phenylene sulfide) and suitable filler, are first blended and then precured. The precured mixture is then placed into a suitable mold such as a compression type mold and formed under pressure to form a part of the desired shape. After molding, the part is removed from the mold and is placed in an area having a heat source suitable for gradually raising the temperature of the part for curing. The initial temperature preferably is below the glass transition point of the mixture and is gradually increased until a maximum temperature is obtained and maintained for a predetermined period to cure the parts. After curing, and depending upon the type of filler used in the mixture, the parts are allowed to cool at either a controlled rate or in the air until they reach ambient or room temperature. The area having the heat source for free sintering and curing of the parts will be hereinafter referred to generically as an oven but it is to be understood that other types of heating devices which may not be commonly referred to as ovens will also work satisfactorily so long as the temperature can be raised gradually.

The essential ingredient of the mixtures is poly(phenylene sulfide) resin (PPS) which is blended with a filler such as one of a group of fillers which reinforces the mixture so as to maintain integrity of the parts made therefrom when same are cured. The fillers can include at least one filler of the group which includes fillers such as polytetrafluoroethylene (PTFE), glass fibers, carbon black, and mineral fillers such as molybdenum disulfide ($MoS_2$), antimony oxide ($Sb_2O_3$), asbestos and graphite. Selected mixtures of filler and poly(phenylene sulfide) are adapted for particular applications with typical examples being as follows (all percentages by weight):

| | |
|---|---|
| 1. Lubricating Bearing Mixture: | PPS 35% |
| | PTFE 40% |
| | $MoS_2$ 25% |
| 2. Lubricating Bearing Mixture: | PPS 40% |
| | $MoS_2$ 33% |
| | $Sb_2O_3$ 27% |
| 3. Structural Mixture: | PPS 50% |
| | PTFE 25% |
| | Glass Fibers 25% |
| 4. Structural Mixture: | PPS 43% |
| | $MoS_2$ 20% |
| | $Sb_2O_3$ 17% |
| | Glass Fibers 20% |

The poly(phenylene sulfide) in the present invention is preferably in the range of 20 to 60 percent by weight with one or more of the fillers making up the remainder of the mixture. Seventy percent by weight of the PPS is the approximate upper limit of PPS which can be processed by a free sintering process.

The following is a list of the approximate weight percentages of the fillers which are added to the poly(phenylene sulfide) to form a free sinterable mixture. It is to be understood that the following list is not all inclusive and other fillers may be used and still be within the scope of the present invention.

| Filler | Minimum Percent | Maximum Percent | Optimum % by Weight |
|---|---|---|---|
| Asbestos | 10 | 50 | 25–40 |
| Graphite | 5 | 30 | 15–20 |
| PTFE | 10 | 90 | 15–45 |
| $MoS_2$ | 10 | 40 | 20–30 |
| Carbon Black | 2 | 10 | 4–8 |
| $Sb_2O_3$ | 13 | 40 | 25–35 |
| Glass Fibers | 10 | 40 | 10–40 |

It has been found that the above listed fillers can be added singularly, or in combination, to form a mixture which can be free sintered.

It has been further found that asbestos can be used as a singular filler to make free sintered parts which can be cooled rapidly. If PTFE, preferably at least 15 percent by weight, is an ingredient of a mixture of poly(phenylene sulfide) with or without at least one other filler, then the mixture containing PTFE can also be cooled rapidly after curing as described hereinbelow in the description of the process.

In processing poly(phenylene sulfide) mixtures such as those described above, the basic steps of the process comprise selecting the filler for the particular application to which the final product is to be used, blending the filler with the poly(phenylene sulfide), which is preferably in particulate form, after which the mixture is precured. After precuring and before molding the mixture is preferably cooled after which same is placed in a mold such as a compression type mold and pressure is applied thereto to form a part of the desired shape. The formed part is then removed and placed in an oven wherein the temperature of the part in the oven is gradually increased at a predetermined rate to a maximum temperature at which the part and oven are maintained until the part is cured. After curing of the part, same is cooled to room temperature and the part is ready for its intended use.

Further according to the invention, the process of free sintering parts from a mixture of poly(phenylene sulfide) and filler the following approximate parameters are followed in the process. The poly(phenylene sulfide) and selected filler or fillers are blended to thoroughly mix same in a suitable manner. The blending can be carried out in any suitable blender such as a Henschel blender as is well known in the art. One good method of blending is to first blend the mixture at a high speed, as for example, 2000 rpm to 2500 rpm for a period of approximately 2 minutes and following same with a low speed blending as, for example, 800 rpm to 1200 rpm for an additional approximate 2 minutes. After blending, the mixture is placed in a suitable container and heated such as in an oven for precuring. The oven for precuring is at an elevated temperature sufficiently high to effect precuring or crosslinking of the poly(phenylene sulfide) within a reasonable time preferably with the precuring temperature being below the melting temperature of the poly(phenylene sulfide) to substantially prevent melting thereof which would form same into a single massive section which would require an additional step for comminution. Thus, for example, the range of temperature of the oven for precuring can be approximately 500°–600°F for a period of 2 to 24 hours and preferably 10 to 15 hours. After the precuring an optional step can be used which would further precure the mixture at a temperature preferably above the initial precure temperature which because of the mixture being crosslinked, now has a higher melting temperature so that the optional precure step can be conducted, if desired, at an elevated temperature which would reduce the time necessary to effect the additional amount of precure. Thus, for example, the optional precure step can be conducted at a temperature of approximately 700°–750°F for a period of 30 to 60 minutes. After precuring, the mixture is removed from the oven and preferably is allowed to cool to room temperature.

It is desirable to cool the mixture to room temperature to facilitate handling and prevent heat buildup in the mold used for molding same, but it is to be noted that the mixture could be molded at temperatures other than room temperature if desired. Preferably the molding of the mixture is accomplished by a compression molding process. The desired amount of mixture is placed in a compression mold as is well known in the art and pressure is applied to the mixture with the pressure being sufficiently high to form the mixture into a solid part of the desired shape. The pressure required would depend upon the particular mixture used and the temperature of same during molding as, for example, the pressure applied can be approximately 5000 psi to 20,000 psi. The mixture is maintained under pressure in the compression mold for a sufficient time to form same into a solid part with the time period being approximately one-half minute to 2 minutes. After the part is formed, same is removed from the mold. It is to be noted that the mold preferably is at room temperature although some heat buildup may result from the molding process but the compression molding need not be performed at an elevated temperature. It is apparent that a plurality of parts can be molded quickly with a minimum of equipment necessary with the parts being stored until a desired quantity is available for the following steps of the process.

One or more of the parts are placed in an oven which preferably is at a temperature below the glass transition point of the mixture. This temperature for poly(phenylene sulfide) is approximately 200°F. The parts are allowed to remain in the oven at its initial temperature below the glass transition point for a sufficient time so that the parts have reached the oven temperature throughout so that there is little or no temperature gradient so as to reduce or prevent stress cracking in the free sintered parts. The time in the oven will depend upon the particular mixture and the rate of heat transfer of the parts and their physical size. This time can be figured at approximately a minimum of 4 minutes per inch of part thickness preferably approximately 5 minutes per inch of part thickness. This time will vary according to the type of oven and is here stated as having found to be the approximate time for a forced air oven. After the parts have attained the initial temperature of the oven, the oven temperature is gradually increased at a rate to maintain a minimum temperature gradient within the parts as, for example, in steps of 50°F. When the temperature is raised in steps as each successive higher oven temperature is reached, the temperature is held for a period of time sufficient for the part to attain the higher temperature substantially throughout to maintain a minimum of temperature gradient in the past as, for example, about 5 minutes per inch of thickness of part. The gradual increase in temperature is effected in the oven until a curing temperature is reached with the curing temperature being sufficient to effect curing of the parts in a reasonable time. In a preferred embodiment of this invention, the incremental temperature increases are continued until the oven reaches a temperature of approximately 400°–450°F after which the oven temperature is allowed to increase at its natural heating rate to a temperature of approximately 650°–750°F, preferably 600°–700°F, which is the maximum temperature used for curing, with the maximum temperature being maintained for a period of time sufficient to cure the parts. This time period can be figured as approximately one hour per inch of part thickness.

After the parts have been cured at the maximum temperature for the desired period of time, same are then cooled and ready for use. Depending upon the filler used with the poly(phenylene sulfide) to form the mixture, the type of cooling or cooling rate is chosen. As described above, if the mixture contains only poly(phenylene sulfide) and asbestos the cured parts can be removed from the oven and cooled in the air. If the mixture of poly(phenylene sulfide) contains PTFE or PTFE and any of the other fillers, the parts formed from the mixture can also be cooled out of the oven in the air. Otherwise, it is preferable to cool the oven and the parts at a rate sufficient to anneal them as, for example, the parts can be cooled in the oven by controlling the cooling rate of the parts at a maximum preferred rate of approximately 4 to 7 minutes per degree Fahrenheit. It is to be understood that any of the parts molded and cured by free sintering can be cooled at a rate slower than the above rates and still produce useable parts. The parts cooled in the oven can be removed at any time after same are at a temperature below their glass transition point which is described above.

The following examples are typical of the above described process.

EXAMPLE I

A mixture of poly(phenylene sulfide) (Ryton V-1, Phillips Petroleum Company) was prepared containing 35 weight percent poly(phenylene sulfide) in particulate form (virgin polymer, melt flow above 2500 g per 10 minutes (according to ASTM-D-1238-70 using a 5 kg weight and a temperature of 600°F)) about 75 mesh, 40 weight percent PTFE (grade 7A powder, DuPont) and 25 percent by weight molybdenum disulfide. The ingredients were placed in a Henschel high speed blender at high speed, 2000 rpm, for 2 minutes and 2 more minutes at a reduced speed of 1000 rpm.

The blended mixture was spread into a metal curing pan at a thickness of not more than ½ inch deep and cured at 520°F for 15 hours. It is important to keep the initial precuring temperature below the burning point of the material which is approximately 600°F. The cured material is then cooled and the material was placed into a cylindrical compression mold having a diameter of 2 inches and a length of 12 inches with a pressure of 10,000 psi applied to the mixture with the mold being at room temperature. After forming the material into parts, same were removed with the parts being approximately 5 to 6 inches long. The parts were placed in an oven at approximately 150°F for 10 minutes. The temperature of the oven was then increased at 50° increments and maintained at each increment of temperature for 10 minutes until the oven had reached 400°F. After 10 minutes at the latter temperature the oven was allowed to increase in temperature continuously to 675°F. The parts were then heated 1½ hours at 675°F and removed from the oven and cooled to room temperature. The resulting parts had shrunk approximately 1/16 inch in diameter and gained approximately 1/16 inch in length and the parts were absent of voids or cracks.

EXAMPLE II

A blend was made from 50 weight percent poly(phenylene sulfide), 25 weight percent PTFE and 25 weight percent glass fibers (Owens Corning type 709 A 1/32 inch milled fibers). The same mixing procedure was followed as in Example I and the blend was precured for approximately 12 hours at 520°F and followed by an additional 1 hour of precure at 700°F, removed from the oven and cooled to room temperature. The mixture was then molded into parts as in Example I and also free sintered as in Example I. The resulting cured parts were absent of voids and cracks.

EXAMPLE III

One hundred percent poly(phenylene sulfide) was precured at 520°F for 15 hours and 700°F for 30 minutes and was then cooled to room temperature after which same was molded into parts as in Example I. The parts were then free sintered as in Example I and the resulting parts fell apart during the free sintering process. This shows that poly(phenylene sulfide) by itself will not readily free sinter.

EXAMPLE IV

A blend of 40 weight percent poly(phenylene sulfide), 30 weight percent molybdenum disulfide and 27 percent antimony trioxide was blended as in Example I. The mixture was precured at 520°F for 2½ hours, cooled, and then reheated to 520°F for 30 additional minutes and then heated at 700°F for 30 minutes. The mixture was cooled and parts were molded therefrom and sintered as in Example I with the parts being allowed to cool in the oven at a slower rate (about 5 minutes/degree F) than air cooling. The resulting parts had a few surface cracks but no structural defects when sectioned. Parts made from this blend which was precured at 520°F only, cracked and failed during sintering showing that this type of blend requires the optional high temperature precure step.

EXAMPLE V

A part made from the blend of Example IV was molded into a rod approximately 5 inches long and free sintered as in Example I. The part was then cooled in the air (rapid cooling) to room temperature instead of allowing it to cool in the oven. The part cracked in the middle as soon as it was removed from the hot oven. Another part was allowed to cool in the oven (slow cooling/annealing at approximately 5 minutes per °F) and same was absent of cracks or voids. This illustrates that blends which do not contain PTFE should be annealed or slow cooled after cure at the preferred cooling rate of 4-7 minutes per degree F.

EXAMPLE VI

A mixture was made of 43 weight percent poly(phenylene sulfide), 20 weight percent molybdenum disulfide, 17 weight percent antimony oxide and 20 weight percent glass fibers. When precured as in Example IV and molded and sintered as in Example I, except that annealing or slow cooling was used, satisfactory parts were the result.

EXAMPLE VII

A mixture of 50 weight percent poly(phenylene sulfide) and 50 weight percent asbestos fibers (Johns Mansville 7RF3) was blended as in Example I and precured at 520°F for 2½ hours. The mixture was molded into parts as in Example I and the resulting parts were free sintered as in Example I with the maximum temperature being maintained for 2 hours. The cured parts were removed from the oven and allowed to cool rapidly in the air with the resulting parts being satisfactory and absent of voids and cracks.

EXAMPLE VIII

A mixture was prepared by blending as in Example I which contained 55 weight percent poly(phenylene sulfide), 25 weight percent titanium dioxide and 20 weight percent PTFE. The mixture was precured as in Example VI. The precured mixture was cooled and molded into parts as in Example I and the parts were then free sintered as in Example I. The cured parts were cooled rapidly in the air and were found to be absent of cracks and voids.

EXAMPLE IX

The following recipe was prepared, precured and subsequently formed by compression molding as in Example I:
- 40 weight percent poly(phenylene sulfide)
- 10 weight percent carbon black (N330)
- 25 weight percent glass fibers
- 25 weight percent PTFE The compression formed parts were free sintered as in Example I and cooled to room temperature in the atmosphere. The resulting cured parts were absent of voids and cracks.

Parts made according to the above described process from the above described mixtures of fillers and poly(phenylene sulfide) can be of any suitable shape including shapes such as rods or other solid figures which can be machined into useable parts such as bearings and the like which require closer dimensional tolerances than those attainable by the free sintering process.

It is to be understood that while I have described certain forms of my invention it is not to be limited to the specific forms herein described.

What is claimed and desired to be secured by Letters Patent is:

1. A method for forming free sintered parts from a mixture of poly(phenylene sulfide) and at least one filler, said process including:
   a. precuring a mixture of poly(phenylene sulfide), said mixture having poly(phenylene sulfide) in an amount of at least approximately 20% by weight and filler at a temperature sufficient to crosslink said poly(phenylene sulfide);
   b. molding said mixture under pressure to form a desired shaped part;
   c. placing said part in a free standing condition in an oven at an initial temperature below its glass transition temperature;
   d. increasing the temperature of said part by gradually increasing the temperature of the oven up to a maximum temperature sufficient for curing said mixture and maintaining said part at the maximum temperature for a period of time sufficient for curing; and
   e. cooling said part to room temperature.

2. The method as set forth in claim 1 including:
   a. cooling said mixture to approximately room temperature after precuring and before molding; and wherein
   b. said maximum temperature is in the approximate range of 650°F to 750°F.

3. The method as set forth in claim 2 wherein:
   a. said precuring is done at a temperature of approximately 500° to 600°F for a period of about 2 hours to 24 hours; and
   b. said temperature increase in the oven for curing being increased gradually from a temperature below the glass transition point of said mixture, with said part being allowed to reach the initial oven temperature before increasing the oven temperature.

4. The method as set forth in claim 3 wherein:
   a. said temperature increase in the oven for curing being increased in incremental steps of approximately 50°F and maintaining said higher temperature for a period of approximately 5 minutes for each inch of thickness of the part said temperature being raised incrementally until a first predetermined temperature is reached.

5. The method as set forth in claim 4 wherein:
   a. said first predetermined temperature being approximately 400°F to 450°F after which the temperature of the oven is raised to said maximum temperature and maintaining the part at the maximum temperature for approximately 1 hour per inch of part thickness.

6. The method as set forth in claim 5 wherein:
   a. said part being molded by compression molding at a pressure of approximately 5000 psi to 20,000 psi for a predetermined period of time.

7. The method as set forth in claim 5 wherein:
   a. said initial oven temperature being as high as approximately 200°F when said part is placed therein with said initial oven temperature being maintained for approximately 5 minutes per inch of part thickness before the incremental temperature increases.

8. The method as set forth in claim 1 wherein:
   a. said mixture containing poly(phenylene sulfide) and a minimum of approximately 15 percent by weight of polytetrafluoroethylene as at least one of the fillers; and
   b. said part being removed from said oven after said maximum temperature is reached and maintained for curing with said part being allowed to cool in the atmosphere to room temperature.

9. The method as set forth in claim 1 wherein:
   a. said filler being only asbestos in the range of approximately 10 percent to 50 percent by weight; and
   b. said part being removed from said oven after said maximum temperature is reached and maintained for curing with said part being allowed to cool in the atmosphere to room temperature.

10. The method as set forth in claim 1 wherein:
    a. said filler being at least one of a group comprising glass fibers and mineral fillers; and
    b. said part being annealed after said maximum temperature is reached and maintained for curing by cooling said part at a rate not exceeding approximately 4–7°F per minute until the glass transition point temperature is reached.

* * * * *